DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JUNE 30, 1970

875 O.G. 713

T875,027

BISPHENOL POLYESTER COATINGS

Winston J. Jackson, Jr., and John R. Caldwell, both of P.O. Box 511, Kingsport, Tenn. 37662

Continuation of application Ser. No. 583,457, Sept. 30, 1966. This application Dec. 22, 1969, Ser. No. 883,664

Int. Cl. B32b *15/08*

U.S. Cl. 161—186

No Drawing. 20 Pages Specification

An article comprising (A) a substrate and (B) a coating of a resinous composition being essentially composed of a mixture of (1) a polyepoxide resin and (2) a bisphenol polyester resin having a second-order transition temperature of at least 150° C. Alternately, the substrate may have a first coating of polyepoxide resin and a second coating or surface film of bisphenol polyester resin having a second-order transition temperature of at least 150° C. Examples of the bisphenol are: 4,4′-isopropylidenediphenol; 4,4′-(2-norbornyledene) diphenol, 4,4′-(hexahydro 4,7 methanoindan 5-ylidene) diphenol; 4,4′-(cyclohexylmethylene) diphenol; and 4,4′-(2-norbornylmethylene) diphenol. The substrate may be an electrical conductor, such as wire.